United States Patent [19]

Martensson et al.

[11] Patent Number: 4,780,297

[45] Date of Patent: Oct. 25, 1988

[54] LOW BRIGHTNESS MAGNESIUM SILICATE FILLER AND METHODS

[75] Inventors: Leif B. Martensson; Kaarina Heikkila, both of Hamina, Finland

[73] Assignee: J. M. Huber Corporation, Rumson, N.J.

[21] Appl. No.: 34,991

[22] Filed: Apr. 6, 1987

[51] Int. Cl.$^4$ ............................................. C01B 33/24
[52] U.S. Cl. ..................................... 423/331; 423/326
[58] Field of Search ......................................... 423/331

[56] References Cited

U.S. PATENT DOCUMENTS

| | | | |
|---|---|---|---|
| 3,325,276 | 6/1967 | Feller | 71/59 |
| 3,328,124 | 6/1967 | Mays et al. | 502/83 |
| 3,328,125 | 6/1967 | Mays et al. | 502/408 |
| 3,401,015 | 9/1968 | Ninger et al. | 423/331 |
| 3,437,441 | 4/1969 | Mays et al. | 502/83 |
| 4,277,449 | 7/1981 | Lalancette | 423/167 |

FOREIGN PATENT DOCUMENTS

| | | | |
|---|---|---|---|
| 624441 | 6/1983 | Belgium | 423/331 |
| 748364 | 12/1966 | Canada | 423/331 |

OTHER PUBLICATIONS

Cosmetic Properties and Structure of Fine-Particle Synthetic Precipitated Silicas, J. Soc. Cosmet. Chem., 29, 497-521 (Aug. 1978).

Primary Examiner—John Doll
Assistant Examiner—Lori S. Freeman
Attorney, Agent, or Firm—Harold H. Flanders; Robert L. Price

[57] ABSTRACT

Low structure magnesium silicate pigment is useful as a low cost, low brightness filler for newsprint. The magnesium silicate is prepared by dissolving a serpentine mineral in sulfuric acid and reacting the resulting solution with an alkali metal silicate to precipitate a magnesium silicate pigment.

16 Claims, 3 Drawing Sheets

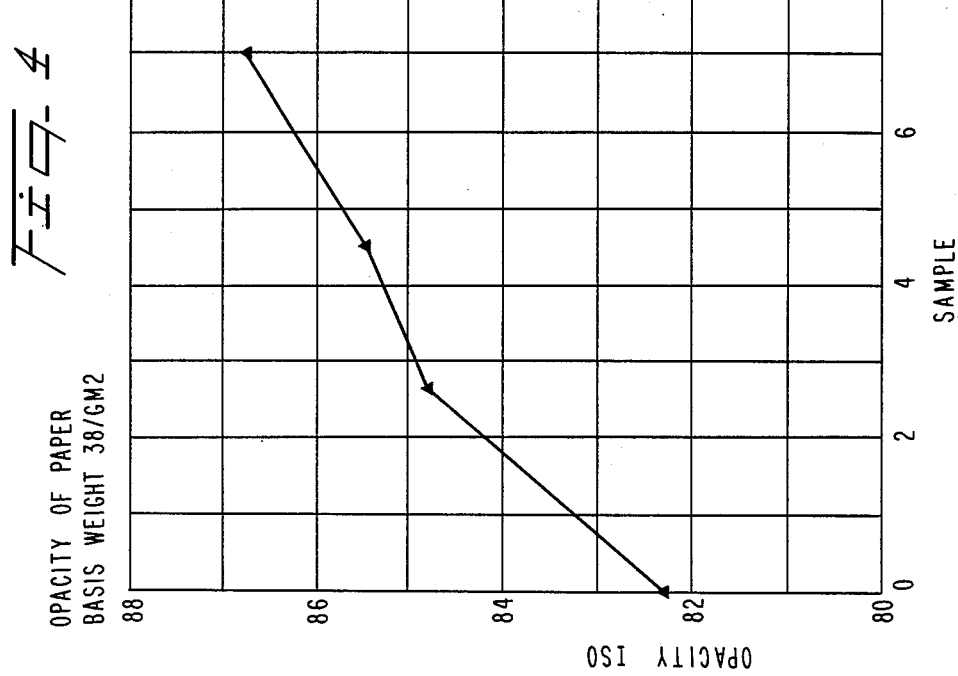
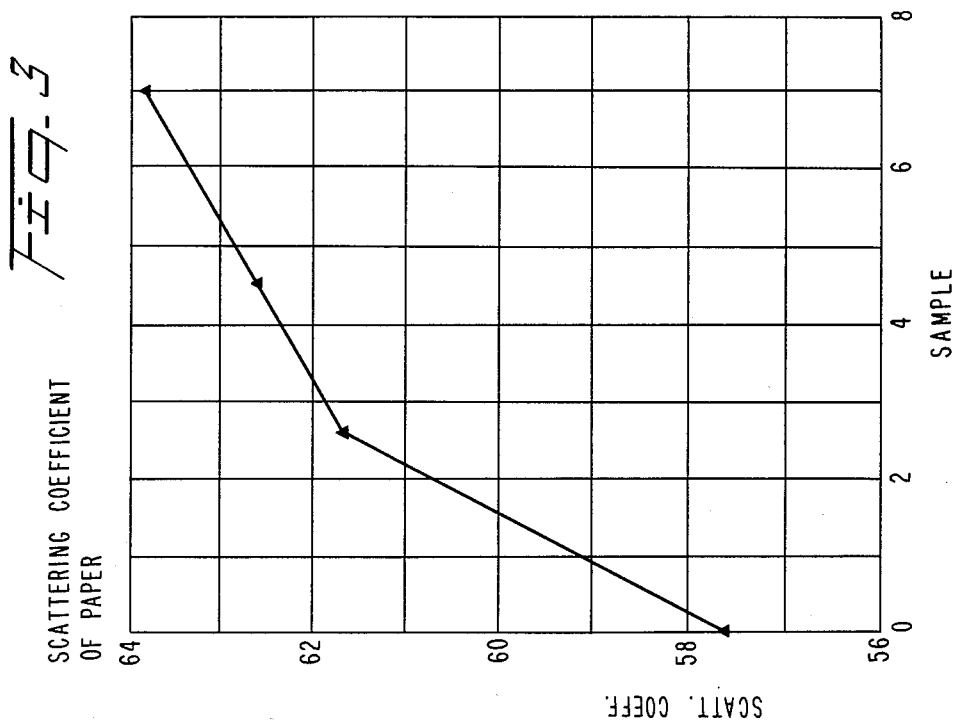

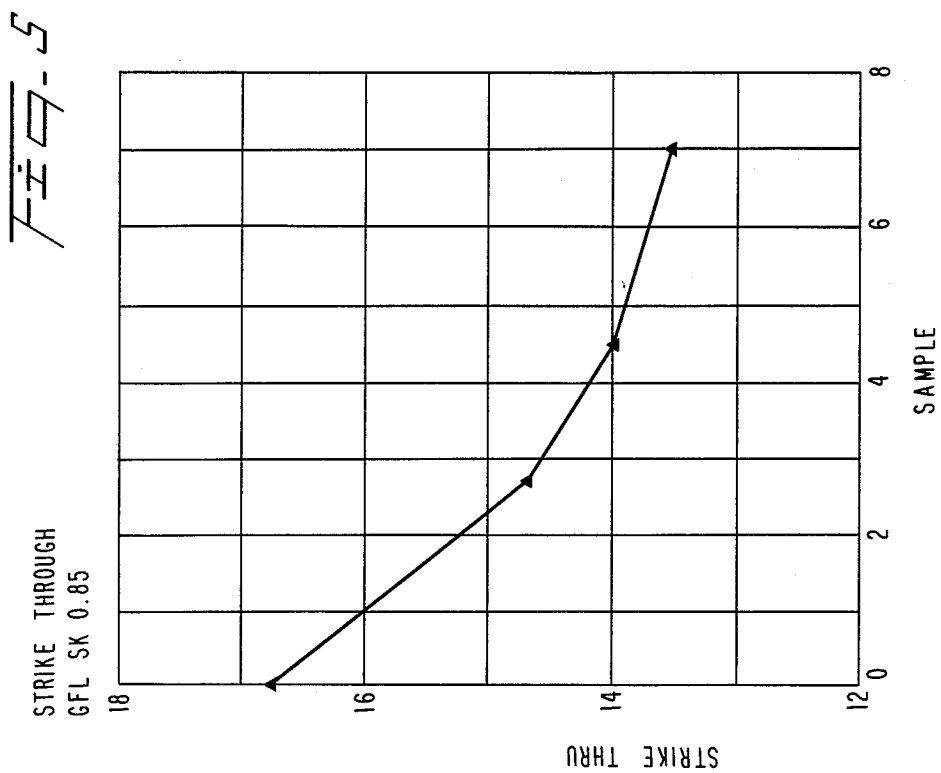

LOW BRIGHTNESS MAGNESIUM SILICATE FILLER AND METHODS

FIELD OF THE INVENTION

This invention relates to a low brightness magnesium silicate filler especially useful for newsprint and to methods for its preparation from the mineral serpentine.

BACKGROUND

There is an increasing need for a low cost, low brightness filler for use in ground wood specialties and newsprint. The paper industry is showing an increasing need for a lower cost, lower brightness filler of this type which will provide comparable performance with higher cost materials prepared from silica, such as the commercial product Zeolex ®, a trademark of the J. M. Huber Corporation. The present invention meets this need by providing a low structure magnesium silicate pigment prepared from a low cost magnesium containing raw material which contains the mineral serpentine.

The precipitation of magnesium silicate with sodium silicate and magnesium salt is known and has been described in the literature. Specific compositions of magnesium silicate are also known and described by Vournazos, Hydraulischer und weisser Magnesiazement, Zeitschrift fur anorganische und allegemeine Chemie, 200 (1931), pp. 237–244, and Strese et al, Synthese von Magnesium-silikatgelen mit swei dimensional regelmassiger Struktut, Zeitschrift fur anorganische und allgemeine Chemie, 247 (1941), pp. 65–95. Other authors have believed the compositions of the magnesium silicate vary depending on the precipitation conditions. Thus, the composition of the final product has been described as a sodium magnesium silicate by Gmelins Handbuch der anorganischen Chemie, System 27, Mg, Teil B, Lieferung 3, Weinheim, Verlag Chemie GmbH, 1938, p. 443, and magnesium silicate, Vournazos, Hydraulischer und weisser Magnesiazement, Zeitschrift fur anorganische und allegemeine Chemie, 200 (1931), pp. 237–244, Strese et al, Synthese von Magnesium-silikatgelen mit swei dimensional regelmassiger Struktut, Zeitschrift fur anorganische und allgemeine Chemie, 247 (1941), pp. 65–95 and Hinz et al, Uber die Fallungsprodukte von Magnesiumsalz- and Wasserglaslosungen, Silikat Technik, 8 (1957), pp. 148–156.

In later work it has been shown that the molar ratio of the produced magnesium silicate is the same as the molar ratio of sodium silicate used in the precipitation, as described by Hinz et al, supra. The sodium oxide content of the final product is low if magnesium salt is in excess in the precipitation and grows with a sodium silicate excess as described by Hinz et al.

The present invention provides a magnesium silicate mineral formed by precipitation which has excellent characteristics for use as a low brightness filler for newsprint.

SUMMARY OF THE INVENTION

It is accordingly one object of the present invention to provide a new low brightness magnesium silicate filler for use in newsprint.

A further object of the invention is to provide an economical low brightness magnesium silicate filler from the mineral serpentine by a precipitation process.

A still further object of the invention is to provide a method for the preparation of a low structure magnesium silicate pigment from serpentinite rocks which contain the mineral serpentine.

Other objects and advantages of the present invention will become apparent as the description thereof proceeds.

In satisfaction of the foregoing objects and advantages, there is provided by this invention a low structure magnesium silicate pigment useful as a low cost, low brightness filler for newsprint. The present invention also provides a method for the preparation of the low structure magnesium silicate pigment by dissolving a magnesium containing mineral such as serpentine in sulfuric acid and precipitating the low structure amorphous magnesium silicate product by reaction with alkali metal silicate. The present invention also provides paper such as newsprint filled with the low structure amorphous magnesium silicate pigment.

BRIEF DESCRIPTION OF THE DRAWINGS

Reference is now made to the drawings accompanying the application wherein:

FIG. 3 shows the scattering coefficient of paper when filled with the magnesium silicate of this invention;

FIG. 4 shows the opacity of paper when filled with the magnesium silicate of this invention; and FIG. 5 shows the strike-through characteristics of paper when filled with the magnesium silicate of this invention.

DESCRIPTION OF PREFERRED EMBODIMENTS

Figure 2:
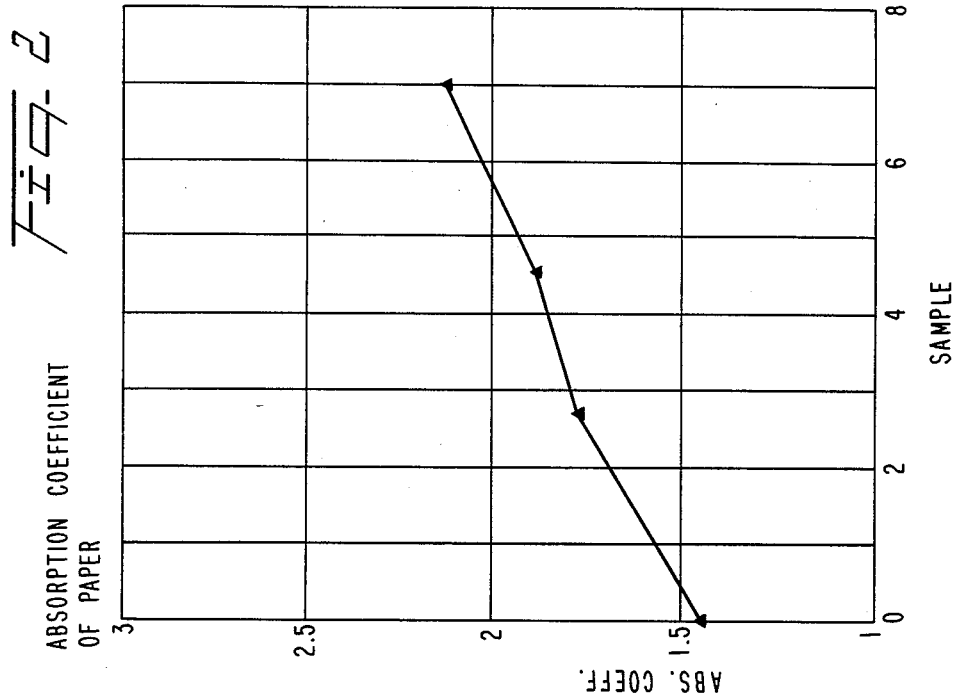
FIG. 2 shows the absorption coefficient of paper when filled with the magnesium silicate of the invention.

As pointed out above, there is a need for a new lower brightness filler for use in newsprint and other areas where high brightness is not a requirement. Such low brightness fillers should be readily available and economical to produce. According to the present invention it has been found that a magnesium silicate can be produced from a low cost product which contains the mineral serpentine which has the necessary characteristics to serve as a low cost, low brightness filler but which retains other characteristics which make it useful as a filler in paper, and particularly as a filler in newsprint.

According to this invention it has been discovered that a magnesium silicate product can be precipitated from the mineral serpentine by dissolving the mineral in sulfuric acid and precipitating the resulting low structure amorphous magnesium silicate. In this invention the brightness of the filler is controlled by controlling the iron in the raw material and/or the amount of reactants in the final product.

The magnesium silicate of this invention is prepared from the mineral or group of minerals called serpentine. The serpentine group minerals all have the approximate composition $Mg_3[SiO_2O_5](OH_4)$. This empirical formula is also sometimes written $H_4Mg_3Si_2O_9$ or as $3MgO \cdot 2SiO_2 \cdot 2H_2O$. Comparatively little substitutions of other ions is found to occur in natural specimens. Many experimental results point to the existence of serpentine with a curved sheet structure. The mineral is soluble in dilute acid. It is often found as the primary component of rocks called serpentinite. Serpentinite may be found in gangue of mines. For example, serpentinite is found in the gangue of nickel mines in Finland, such as in the Hitura nickel mine situated in Nivala, East Bothnia, Finland.

The structure of serpentine comprises a tetrahedral $Si_2O_5$ network joined to a brucite $Mg_3(OH)_4$ layer. Serpentine is less slippery than talc, for example, in containing less layers and is more hydrophilic than talc. Also, the magnesium solubility of talc in acid is lower than that of serpentine.

The preferred starting material for use in the invention is the serpentine found in the Hitura serpentinite described above. This material is a uniquely cationic mineral which becomes more cationic with milling. The material contains about 6 to 7% iron in the lattice, which is important since the brightness of the mineral depends on its iron content. The mineral is hydrophilic, soluble in dilute acids and has a remarkably large specific surface area for a mineral, has substantial free bonding possibilities and is soft and plastic and workable. It does not contain asbestos or quartz.

In this invention, the magnesium silicate is produced from serpentine by initially dissolving the serpentinite or corresponding serpentine-containing material in sulfuric acid which forms magnesium sulfate in sulfuric acid solution. The serpentinite has excellent solubility in sulfuric acid at temperatures below 100° C. and using 15-30% concentration sulfuric acid. By adjustment of the temperature, acid concentration and ratio, the dissolution of iron versus magnesium can be controlled to provide good control over the final brightness of the magnesium silicate pigment. The dissolution of serpentinite in the sulfuric acid is an exothermic reaction. In experiments it was found that the reaction velocity was remarkably slower at the temperature of 25° C. than at 90° C. for dissolution of the serpentinite. Only 57% of the magnesium was dissolved at 25° C. in one hour, while at 90° C., the percentage was 90% under otherwise the same conditions. In four hours, 67% of magnesium was dissolved at 25° C. At a temperature of 200° C., the dissolving percentage of magnesium was on the same level as at 90° C. Therefore, a dissolving temperature of below 100° C. is believed sufficient to reach a desirable reaction velocity.

The lower limit of the sulfuric acid concentration is fixed by the required magnesium concentration of the produced solution and the upper limit by the crystallization of the desired magnesium sulfate. The sulfuric acid concentration can therefore range from about 15 to 30%.

In the second phase of this reaction, the magnesium is precipitated from the serpentinite/sulfuric acid mixture as silicate by reaction with an alkali metal silicate, such as sodium silicate. In the process, the starting serpentine or serpentinite is initially dissolved in sulfuric acid which forms magnesium sulfate in admixture with sulfuric acid solution and a silica leach residue (SLR). Sufficient serpentine mineral should be used to react with the available sulfate in the sulfuric acid and form the magnesium sulfate in a solution which contains the liquid and any residual materials. Thereafter, the alkali metal silicate is added in sufficient amounts to precipitate the magnesium as a magnesium silicate. The amount of alkali metal silicate to be added to precipitate the magnesium silicate should be at least the stoichiometric amount required to react with the magnesium content of the solution.

The term "SLR" is used herein to refer to the siliceous product which results from the acid leaching of a silica-containing mineral. Products of this type are described in U.S. Pat. Nos. 3,328,124, 3,328,125, 3,325,276, and 3,437,441, the disclosures of which are incorporated herein by reference.

The procedure for conducting the reaction is preferably to dissolve the serpentine-containing mineral in sulfuric acid and heat to a temperature of about 25°-200° C., and preferably about 25° to 100° C. It may be necessary to heat for a period of from three hours up to eight hours to achieve adequate and complete solution of the serpentine mineral. Thereafter, at the required temperature and preferably at about 50°-100° C., the alkali metal silicate, preferably sodium silicate, is added as an aqueous solution of any desired concentration in sufficient amounts to react with the magnesium contained in the solution. The alkali metal silicate is preferably added as an aqueous solution having a concentration of about 200-400 g/l. Preferably, excess silicate is continued to be added to the solution until a pH in the range of 8-10, preferably 9.5, is achieved.

In the most preferred procedure, the alkali metal silicate and the solution of magnesium sulfate contained in the sulfuric acid after dissolution of the serpentine, are added simultaneously to the reactor. The rate of addition of alkali metal silicate should be abut 1-3 times the rate of the addition of the magnesium sulfate/ sulfuric acid solution. During the addition, the precipitation pH is preferably controlled in the range of 9.1 to 9.5, and the temperature in the range of 60°-80° C. In this preferred procedure, the silicate addition is then stopped and the addition of magnesium sulfate and sulfuric acid solution continued until a final pH of 8.5 is reached. Pigment stabilization may then be carried out with the addition of alum.

As a result of this process, a magnesium silicate precipitate is obtained, which is an excellent pigment, particularly for use as a filler in paper. In experiments conducted using the magnesium silicate pigment as a filler in paper, it was found that results comparable to the commercial product Zeolex ® were obtained without the unwanted brightness increase, so that the magnesium silicate is imminently suitable for use as a filler in newsprint. For use in newsprint, the brightness $R_{457}$ should be in the range of about 60-80, and it should have an oil absorption of about 50-90 ml/100 g by the ASTM rubout method, ASTM Test D281.

Figure 1:
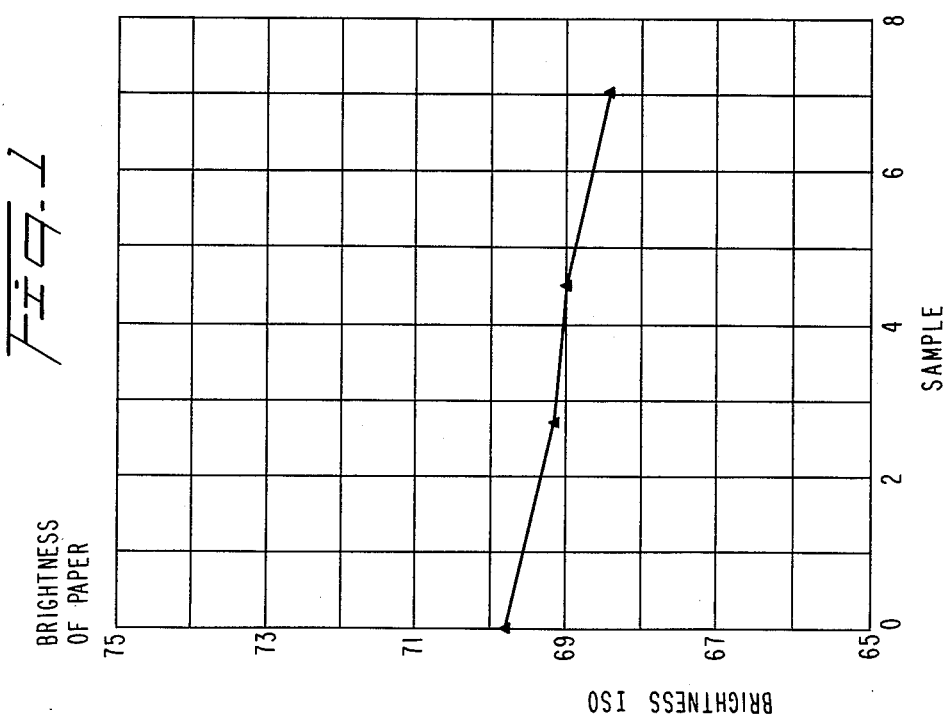
FIG. 1 shows the brightness of paper filled with the magnesium silicate of this invention.

The magnesium silicate pigment produced according to the present invention, when incorporated into paper, shows the resulting brightness of the paper as set forth in FIG. 1 accompanying the application. In FIG. 1 it will be noted that brightness ranges from about 69.8% for unfilled paper to about 68.5% as the amount of the magnesium silicate increases in the paper. Thus, the filler reduces the brightness to a desirable level.

In FIG. 2, the absorption coefficient is shown for incorporation of varying amounts of the magnesium silicate into the paper. It will be noted that the absorption coefficient rises well above 2 as the amount of the magnesium silicate in the paper increases.

FIG. 3 shows the scattering coefficient of paper on incorporation of increasing amounts of the magnesium silicate of this invention. As will be seen, the scattering coefficient increases from less than 58 for unfilled paper up to about, 63.8 with 7% of the magnesium silicate of this invention.

FIG. 4 illustrates the opacity of the paper when filled with the magnesium silicate of this invention. It will be noted that the opacity increases from about 82.3 for unfilled paper up to about 86.8 for paper containing 7 wt.% of the magnesium silicate of this invention.

FIG. 5 shows the strike-through of newsprint when containing the magnesium silicate of this invention. It will be noted from FIG. 5 that the initial strike-through for unfilled newsprint is about 16.8. The magnesium silicate filler reduces the strike-through to 14 with about 4.5% of the filler and down to about 13.6 with 7% of the magnesium silicate filler.

Therefore, it was seen that the magnesium silicate of this invention provides advantageous characteristics to the paper while reducing the brightness to a level desirable for newsprint.

The following examples illustrate the process and products of the present invention, but the invention is not to be considered as limited thereto. In the examples and throughout the specification, parts are by weight unless otherwise indicated.

In the following examples, the starting material was a serpentinite mineral obtained from the Hitura mine in Finland. The chemical analyses of the serpentinite was as follows:

TABLE 1

| Chemical analysis of Hitura serpentinite | |
|---|---|
| $SiO_2$ | 37.2% |
| MgO | 35.0% |
| Fe | 6.7% |
| Ni | 0.22% |
| Na | 0.22% |
| Al | 0.36% |
| S | 0.56% |
| Cu | 0.05% |

The physical properties of the serpentinite were as follows:

TABLE 2

| Physical properties | |
|---|---|
| pH 20% | 8.90 |
| Surface area ($M^2/g$) | 40 |
| Oil-absorption (ml/100 g) | 38.3 |
| Mesh 325 residue (5) | 0.25 |
| Ignition loss (%) | 13.6 |
| APS (um) | 5.7 |
| Brightness $R_{457}$ | 40.7 |

The particle size distribution of the serpentinite was as follows:

TABLE 3

| Particle size distribution | |
|---|---|
| um | % |
| −40 | 100 |
| −30 | 96 |
| −20 | 88 |
| −15 | 84 |
| −10 | 78 |
| −5 | 61 |
| −3 | 43 |
| −2 | 30 |
| −1 | 16 |

EXAMPLE 1

In this Example, the effect of sulfuric acid concentration and equivalent acid ratio on the dissolution of iron calculated to 34 $Mg^{++}$ gram/liter in the solution was determned.

TABLE 4

Effect of sulfuric acid concentration and equivalent acid ratio on the dissolution of iron calculated to 34 $Mg^{2+}$ g/l in the solution.

| | equivalent acid ratio | | | |
|---|---|---|---|---|
| $H_2SO_4$ % | 0.6 | 0.685 | 0.825 | |
| 15 | 13.4 | 8.95 | 7.6 | (Fe g/l) |
| 20 | 9.3 | 8.3 | 7.9 | |
| 30 | 8.3 | 6.1* | 5.7 | |

*T = 90° C.

EXAMPLE 2

In this example, the effect of concentration of sulfuric acid and equivalent acid ratio on the dissolution percentage of magnesium was determined.

TABLE 5

Effect of concentration of sulfuric acid and equivalent acid ratio on the dissolution percentage of magnesium.

| | equivalent acid ratio | | | | |
|---|---|---|---|---|---|
| $H_2SO_4$ % | 0.5 | 0.6 | 0.685 | 0.8 | 0.825 |
| 10 | — | — | — | 86.5 | |
| 15 | 59.9 | 72.6 | 75.3 | — | 87.7 (%) |
| 20 | 57.2 | 70.4 | 76.3 | — | 85.3 |
| 30 | — | 70.1 | 89.7* | — | 87.5 |

*T = 90° C.

EXAMPLE 3

In this example, the effect of sulfuric acid concentration and equivalent acid ratio on the SLR content of the dissolution calculated at 34 h $Mg^{++}/l$ in the solution was determined.

TABLE 6

Effect of sulfuric acid concentration and equivalent acid ratio on the SLR-content of dissolution calculated to 34 h $Mg^{2+}/l$ in the solution.

| | equivalent acid ratio | | | |
|---|---|---|---|---|
| $H_2SO_4$ % | 0.6 | 0.685 | 0.825 | |
| 15 | 151 | 132 | 97 | (SLR g/l) |
| 20 | 149 | 132 | 116 | |
| 30 | — | 122* | 111 | |

*T = 90° C.

EXAMPLE 4

In this example the chemical analysis of an SLR sample with solution parameters: $H_2SO_4$ 30%, equivalent acid ratio 0.850, and temperature of 90°-100° C. was determined.

TABLE 7

Chemical analysis of an SLR sample with solution parameters: $H_2SO_4$ 30%, equivalent acid ratio 0,850 and temperature 90-100° C.

| Fe | 6.7% |
|---|---|
| Mg | 9.9% |
| $SiO_2$ | 60.9% |
| Na | 0.18% |
| Al | 0.50% |
| S | 0.83% |

EXAMPLE 5

In this example, the magnesium silicate product is prepared. In this example, there was initially placed in a reactor 5.7 liters of water which contained 4% sodium sulfate. There was then added to the reactor a sodium silicate solution having a concentration of 270 grams per liter and an MR of 3.3. The sodium silicate was added at a flow rate of 0.385 liters per minute. Simultaneously a dilute magnesium sulfate and SLR solution was added which had a magnesium ion concentration of 34 grams per liter, the solution parameters consisting of sulfuric acid 30%, acid ratio 0.85 and a temperature of 80°–100° C. The iron, $SO_4$ and SLR content can be effected in this reaction by changing the dissolution parameters of the serpentinite. The flow rate of this solution was 220 liters per minute. Alum was included in this solution at a concentration of 358 grams per liter for pigment stabilization.

These reaction media were added to the reactor simultaneously while heating to 80° C. Excess silicate was added to a pH of 9.5. The precipitation pH is controlled in the range of 9.1 to 9.5 and the temperature at 65° C. The silicate addition was stopped after 25 minutes, but the magnesium sulfate and SLR solution was added until a pH of 8.5 was reached.

The precipitated pigment slurry was stabilized with alum to a concentration of 358 grams per liter after filtration and washed on a filter. The results of this reaction are set forth below as Run A. A separate run (Run B) was made differing only in that the alum was added in the reactor and the pigment was filtered and washed on a Buchner funnel. Both of these experiments are shown in the following Table 8.

TABLE 8

Results of the magnesium silicate precipitation trials

|  | Run A Trial with stabilization after reactor | Run B Trial with stabilization in reactor |
|---|---|---|
| Reactor | | |
| pigment conc. (g/l) | 151.9 | 165 |
| pH | 8.7 | 7 |
| Dissolver | | |
| Brightness $R_{457}$ | 66.7 | 59.9 |
| Oil-absorption (ml/100 g) | 108 | 114.8 |
| pH | 10.1 | 9.45 |
| After stabilization and pearl milling (trial at FPPRI) | | |
| pH 5% | 7.5 | |
| Oil-absorption | 66.3 | |
| Brightness $R_{457}$ | 67.1 | |
| WCM (%) | 58.3 | |
| Mesh 325 residue (%) | 0.37 | |
| $Na_2SO_4$ (%) | 6.08 | |
| APS (μm) | 8.5 | |

The reaction equations to produce the magnesium silicate of this invention including the amounts of each reactant and product are set forth below including a summarized equation:

Reaction equations:
(1) Serpentinite + $H_2SO_4$ + $H_2O$ → $Mg^{2+}$ + $Fe^{3+/2+}$ + SLR + $SO_4^{2-}$ + $2H^+$ + $H_2O$
   894 g      789 g      203 g         33 g      658 g    773 g      16 g
(2) $Mg^{2+}$ + $Fe^{3+/2+}$ + SLR + $SO_4^{2-}$ + $2H^+$ + $H_2O$ + $Na_2O.3,3SiO_2$ → X-120 + $Na_2SO_4$ + $Mg^{2+}$ + $Fe^{3+/2+}$ + $H_2O$ Serpentinite + $H_2SO_4$ + $H_2O$ + $Na_2O.3,3SiO_2$ → X-120 + $Na_2SO_4$ + $Mg^{2+}$ + $Fe^{3+/2+}$ + $H_2O$
   894 g       789 g        2616 g                    3756 g   1086.5 g    14 g      4 g $\begin{cases} 5\% \ Na_2SO_4 \\ 15\% \ H_2O \end{cases}$ filtrate loss The following chemical analysis is of the magnesium silicates obtained from Runs A and B of this experiment.

TABLE 9

Chemical Analysis of the magnesium silicate precipitation trials.

| Sample | Run A Trial with stabilization after reactor | Run B Trial with stabilization in reactor |
|---|---|---|
| Fe % | 2.0 | 2.2 |
| Mg % | 4.8 | 5.7 |
| Na % | 0.95 | 1.6 |
| Al % | 1.9 | 1.6 |
| $SiO_2$ % | 73.4 | 71.0 |
| S % | 0.18 | 0.15 |

The theoretical composition of the magnesium silicate was calculated on the basis of the data collected in the production of the slurry. In comparison with the actual chemical analysis of the final product, it will be noted that the iron content is about the same, the magnesium content is higher, the silica content is lower, the sodium sulfate content is higher, and the ignition loss is about the same. These comparisons are as follows:

TABLE 10

Theoretical, unstabilized composition in comparison with chemical analysis.

|  | Theoretical composition | Chemical analysis |
|---|---|---|
| FeO | 2.4 | 2.5 |
| MgO | 11.3 | 8.0 |
| $SiO_2$ | 63.7 | 73.4 |
| Na | 2.4 | 0.95 |
| $Na_2SO_4$ | 5.0 | — |
| Al | 0.09 | 1.9 |
| S | 0.15 | 0.18 |
| LOI | 15.0 | 13.07 |

The analysis for magnesium, SLR content, and free acid were determined as set forth below. Iron was analyzed by an outside laboratory.

Magnesium

A method for analysis of magnesium has been developed. In this method magnesium is determined titrimetrically by means of Titriplex ® III (Sodium-EDTA +NaOH, Merck 9992) and indicator buffer tablets (Merck 8430) normally used for determination of water hardness. Calcium is not present in large enough amounts to interfere. The SLR has to be filtered off and iron ions masked by triethanolamine before the titration.

The dissolution sample is filtered and diluted 1:2000 with deionized water. 10 ml triethanolamine (dilution 1:1) and one indicator tablet are added in 100 ml of the diluted sample. After the tablet has dissolved, 1 ml ammonia (conc. 25%) is added to adjust pH. The solution is titrated with 0,01 M Titriplex ® III solution until the color changes from red to green. The results agree well with AAS determinations of magnesium.

SLR

The silica leach residue (SLR) content is determined by filtering 250 ml slurry through quantitative filter paper using suction. The cake is washed with hot deionized water and dried at 150° C. for 16 hours. The SLR content (g/l) is calculated.

Chemical analysis were made on an SLR sample from a test where the solution parameters were:
sulfuric acid concentration 30%
equivalent acid ratio, 0.85
temperature 90°-100° C.

Free Acid

Free acid in the $MgSO_4$ +SLR-solution is tested by the titration of the filtrate with 0.1 M NaOH. Calculated free acid content changed from 0.04 to 0.13 g/l depending on the used sulfuric acid concentration, equivalent acid ratio and dissolving temperature. The pH of the filtrates were about 2-3, which indicates the same free acid contents as measured by the titration.

EXAMPLE 6

A trial was made for use in paper on the pilot paper machine at the Finnish Pulp and Paper Research Institute (FPPRI). The trial was made using the following conditions:

| Furnish | Groundwood (E-G, Summa) | 80% |
|---|---|---|
| | Bleached pine pulp | 20% |
| Freeness (CSF) | Groundwood | 78 ml |
| | Pulp | 500 ml |
| | Furnish | 106 ml |
| pH | | 4.8–5.2 |
| Retention aid | | none |

The results are shown in the attached Tables 11-12 and FIGS. 1-5.

The following conclusions can be made from these results:

The brightness of the base paper was slightly too high.

The retention of the Magnesium Silicate was the same or better than that of Zeolex ®.

The concentrations of Mg, Ca, Fe and Si dissolved into the white water were higher than those determined during the Zeolex ® run. This was expected but the levels are acceptable.

The formation was constant or slightly better compared to the control paper.

Magnesium Silicate has not influenced the bulk of the uncalendered paper.

If the bulk of the calendered samples would be the same, the smoothness of Magnesium Silicate containing paper would be better than that of the control sample.

The porosity has increased as expected.

Brightness and Y-value have decreased and absorption coefficient has increased due to too bright furnish.

The scattering coefficient has increased being equal to the effect of Zeolex ®.

Opacity has increased by one unit for each % filler.

The ink requirement has not changed.

Strike through has decreased, however the effect of Zeolex ® has been better in this trial.

These results can be summarized so that Magnesium Silicate works in wood-containing paper completely and essentially is on part with Zeolex ® except for the lower brightness.

TABLE 11

| | Tests Made by FPPRI | | | | |
|---|---|---|---|---|---|
| Run No. | 0 | 1 | 2 | 3 | 4 |
| Magnesium Silicate (Run A) | — | X | X | X | — |
| Zeolex 111 ® | — | — | — | — | X |
| Filler dosage, % | — | 10.7 | 11.5 | 16.0 | 11.5 |
| Ash content, % | — | 1.5 | 3.4 | 6.3 | 3.6 |
| Filler retention, % | — | 15.0 | 29.6 | 39.4 | 31.3 |
| First pass retentions, % | | | | | |
| Total | 72.0 | 69.4 | 66.6 | 56.7 | 61.3 |
| Filler | — | 8.4 | 35.7 | 26.1 | 16.1 |
| Fiber | — | 76.2 | 72.8 | 65.9 | 70.3 |
| Formation* | | | | | |
| TM | 6.9 | 6.8 | 6.8 | 6.9 | 6.3 |
| Nokia, On-Line | 7.0 | 6.8 | 6.8 | 6.9 | 6.6 |
| Beta-formation | 10.5 | 10.5 | 10.4 | 10.9 | 10.1 |
| Strength | | | | | |
| Tensile index MD | 35.3 | 37.2 | 33.6 | 36.6 | 35.5 |
| NM/g CD | 15.4 | 15.1 | 14.7 | 15.4 | 14.6 |
| Tear index MD | 3.72 | 3.42 | 3.37 | 3.40 | 3.35 |
| $MN/m^2$/g CD | 4.81 | 4.84 | 4.78 | 4.62 | 4.77 |
| Surface strength FS | 0.49 | 0.47 | 0.44 | 0.50 | 0.46 |
| IGT, MD WS | 0.47 | 0.49 | 0.46 | 0.47 | 0.47 |
| Basis weight, $g/m^2$ | 38.5 | 38.7 | 38.1 | 38.0 | 37.4 |

*The smaller value, the better formation.

TABLE 12

| | | Uncalendered samples | | | | | Calendered samples | | | | |
|---|---|---|---|---|---|---|---|---|---|---|---|
| | | -1 | -2 | -3 | -4 | -5 | -6 | -7 | -8 | -9 | -10 |
| Basis weight, $g/m^2$ | | 39.0 | 39.7 | 39.7 | 38.6 | 39.3 | 38.4 | 39.4 | 37.7 | 38.1 | 38.1 |
| Caliper, μm | | 103 | 103 | 103 | 102 | 105 | 57 | 62 | 63 | 58 | 62 |
| Bulk, $cm^3/g$ | | 2.64 | 2.59 | 2.59 | 2.64 | 2.67 | 1.48 | 1.58 | 1.67 | 1.52 | 1.63 |
| Ash content, % | | 0.26 | 2.61 | 4.24 | 6.95 | 4.73 | 0.27 | 2.54 | 4.11 | 6.21 | 3.70 |
| Run A, Magnesium Silicate % | | — | 2.76 | 4.68 | 7.87 | — | — | 2.67 | 4.52 | 6.99 | — |
| Zeolex 111 ®, % | | — | — | — | — | 4.97 | — | — | — | — | 3.81 |
| Filler | FS | — | 38.6 | 44.5 | 36.3 | 39.0 | — | 38.0 | 41.3 | 37.0 | 34.8 |
| distribution, % | FM | — | 40.0 | 36.4 | 33.5 | 44.1 | — | 33.7 | 37.3 | 38.7 | 42.3 |
| | WM | — | 12.8 | 14.5 | 15.9 | 7.8 | — | 19.6 | 13.3 | 16.1 | 14.9 |
| | WS | — | 8.6 | 4.6 | 14.3 | 9.1 | — | 8.7 | 8.1 | 8.2 | 8.0 |
| Smoothness | FS | — | — | — | — | — | 74 | 92 | 100 | 68 | 92 |
| ml/min Bendtsen | WS | — | — | — | — | — | 63 | 74 | 81 | 56 | 71 |
| Porosity, ml/min | | — | — | — | — | — | 265 | 315 | 435 | 410 | 415 |
| Brightness | FS | 70.6 | 69.7 | 69.5 | 69.0 | 72.0 | 69.9 | 69.3 | 69.1 | 68.6 | 71.3 |
| ISO | WS | 70.6 | 69.8 | 69.5 | 69.0 | 72.3 | 69.7 | 69.0 | 68.8 | 68.3 | 71.3 |
| Y-value | FS | 80.6 | 79.4 | 79.0 | 77.9 | 81.6 | 80.6 | 78.9 | 78.4 | 77.4 | 80.9 |
| | WS | 80.6 | 79.4 | 78.9 | 77.8 | 81.8 | 79.9 | 78.5 | 78.1 | 77.1 | 80.8 |

TABLE 12-continued

|  | Uncalendered samples | | | | | Calendered samples | | | | |
| --- | --- | --- | --- | --- | --- | --- | --- | --- | --- | --- |
|  | -1 | -2 | -3 | -4 | -5 | -6 | -7 | -8 | -9 | -10 |
| Absorption coefficient, k | 1.39 | 1.70 | 1.82 | 2.11 | 1.33 | 1.45 | 1.78 | 1.89 | 2.14 | 1.42 |
| Scattering coefficient, s | 59.19 | 63.28 | 64.49 | 66.48 | 64.74 | 57.57 | 61.75 | 62.62 | 63.85 | 62.54 |
| Opacity, ISO | 82.4 | 84.7 | 85.3 | 86.3 | 83.6 | 82.3 | 84.8 | 85.5 | 86.8 | 83.8 |
| Printability, GLF, $S_k = 0.85$ |  |  |  |  |  |  |  |  |  |  |
| Ink requirement, g/m$^2$ | — | — | — | — | — | 2.50 | 2.38 | 2.60 | 2.45 | 2.38 |
| Strike through | — | — | — | — | — | 16.8 | 14.7 | 14.0 | 13.6 | 13.7 |

In this specification, the brightness value $R_{457}$ is the reflectivity value for brightness measured by reflectance. In the drawings ISO stands for International Standards Organization, which measures light using an Elephro light meter.

The invention has been described herein with reference to certain preferred embodiments. However, as obvious variations thereon will become apparent to those skilled in the art, the invention is not to be considered as limited thereto.

What is claimed is:

1. A method of producing a low-structure magnesium silicate containing iron useful as a paper filler, comprising
   adding a mineral source of iron ions and soluble magnesium ions and sulfuric acid in proportions and under conditions effective to form magnesium sulfate dissolved in said acid and a silica leach residue (SLR); and
   adding thereto a solution of an alkali metal silicate in an amount and under conditions effective to precipitate the magnesium ions and form a low-structure, low-brightness product comprising magnesium silicate and SLR.

2. The method of claim 1, wherein
   the sulfuric acid is added as an about 15 to 30 wt% aqueous sulfuric acid solution.

3. The method of claim 1, wherein
   the addition of the mineral source of ions and the silica and the sulfuric acid is conducted at a temperature of about 25° to 200° C. for a period of time of about 3 to 8 hours.

4. The method of claim 3, wherein
   the addition temperature is up to about 100° C.

5. The method of claim 1, wherein
   the amount of alkali metal silicate added is at least about the stoichiometric amount to react with the magnesium ions in solution.

6. The method of claim 1, wherein
   the alkali metal silicate is added at a temperature of about 50° to 100° C.

7. The method of claim 1, wherein
   the alkali metal silicate is sodium silicate.

8. The method of claim 1, wherein
   the alkali metal silicate solution is an aqueous solution having an about 200 to 400 g/l alkali metal silicate concentration.

9. The method of claim 1, wherein
   the alkali metal silicate is added until the pH of the solution is about 8 to 10.

10. The method of claim 1, wherein
    the alkali metal silicate solution and the magnesium sulfate solution and the SLR are added simultaneously and at a rate of about 3 to 1:1.

11. The method of claim 10, wherein
    the alkali metal silicate solution and the admixture are added at a temperature of about 60° to 80° C.

12. The method of claim 11, wherein
    the pH of the solution during the precipitation of the magnesium ions is maintained at about 9.1 to 9.5.

13. The method of claim 12, further comprising
    stopping the addition of the silicate solution when a pH of about 9.1 to 9.5 is reached; and
    continuing the addition of the admixture to a final pH of about 8.5.

14. The method of claim 11, further comprising
    adding a product-stabilizing amount of alum.

15. The method of claim 11, wherein
    the mineral source is serpentine.

16. The method of claim 11, further comprising
    recovering the magnesium silicate product by filtering the slurry to obtain a solid product; and washing and drying said product.

* * * * *